United States Patent
Wann

(10) Patent No.: US 11,452,962 B2
(45) Date of Patent: Sep. 27, 2022

(54) EXPLOSION PROOF DRUM KIT

(71) Applicant: Imperial Systems, Inc., Mercer, PA (US)

(72) Inventor: Jeremiah Wann, Mercer, PA (US)

(73) Assignee: Imperial Systems, Inc., Mercer, PA (US)

( * ) Notice: Subject to any disclaimer, the term of this patent is extended or adjusted under 35 U.S.C. 154(b) by 637 days.

(21) Appl. No.: 16/538,449

(22) Filed: Aug. 12, 2019

(65) Prior Publication Data

US 2020/0047104 A1 Feb. 13, 2020

Related U.S. Application Data

(60) Provisional application No. 62/752,768, filed on Oct. 30, 2018, provisional application No. 62/717,328, filed on Aug. 10, 2018.

(51) Int. Cl.
  *B65D 90/58* (2006.01)
  *B01D 46/00* (2022.01)
  *B65B 1/06* (2006.01)
  *B65B 1/28* (2006.01)

(52) U.S. Cl.
  CPC ............ *B01D 46/0093* (2013.01); *B65B 1/06* (2013.01); *B65B 1/28* (2013.01); *B65D 90/58* (2013.01)

(58) Field of Classification Search
  CPC ........... B01D 46/0093; B01D 46/0004; B65D 90/58; A47L 9/125; A47L 9/1683; A47L 9/1691; A47L 9/106; A47L 9/24; A47L 9/186; B65B 1/06; B65B 1/28

USPC ............. 55/359, 312, 432, 429; 141/86, 388
See application file for complete search history.

(56) References Cited

U.S. PATENT DOCUMENTS

| | | | |
|---|---|---|---|
| 4,820,320 A * | 4/1989 | Cox | B01D 46/0005 55/508 |
| 5,000,767 A * | 3/1991 | Sanders | B01D 46/2411 55/432 |
| 7,247,180 B1 * | 7/2007 | Hill | B24B 55/06 55/315 |
| 7,282,074 B1 * | 10/2007 | Witter | B24B 55/06 451/87 |
| 8,393,050 B2 * | 3/2013 | Witter | B01D 46/2411 15/353 |

(Continued)

FOREIGN PATENT DOCUMENTS

CA  2814468 A1 * 8/2014 ............ B01D 45/08

*Primary Examiner* — Rafael A Ortiz
(74) *Attorney, Agent, or Firm* — Jonathan M. D'Silva; MMI Intellectual Property

(57) ABSTRACT

What is presented is an interface between a hopper and a dust receptacle of a dust collector system, wherein the hopper has an outlet through which collected dust drops. A slide gate is mounted to the outlet of the hopper and a spout is mounted to the slide gate. A lid is configured to secure to the top of the dust receptacle. The lid has a coupling configured to secure to the spout. A slot comprising a locking feature is located on either the spout or the coupling. A rod corresponding to the slot is mounted to the other of the spout or the coupling than which the slot is located. The lid may be removed from the dust receptacle by lifting the lid to move the rod through the slot and the lid is secured by twisting the coupling relative to the spout to move the rod into the locking feature.

6 Claims, 3 Drawing Sheets

(56) References Cited

U.S. PATENT DOCUMENTS

| | | | |
|---|---|---|---|
| 8,394,162 B2* | 3/2013 | Lin | A47L 9/00 55/357 |
| 9,017,441 B1* | 4/2015 | Vemuri | A47L 9/125 55/432 |
| 2011/0219734 A1* | 9/2011 | Lin | B03C 3/017 55/429 |
| 2019/0133393 A1* | 5/2019 | Cheng | B01D 46/24 |

* cited by examiner

EXPLOSION PROOF DRUM KIT

BACKGROUND

Manufacturing and industrial systems have robust systems for the processing of air to remove dust, improve air quality, increase worker safety, etc. These dust collector systems typically include a dust receptacle for dust removal. Some of the dust collector systems are installed in air systems where the collected dust represents an explosion risk. In prior art systems, the components of the dust collector systems are susceptible to the heat and pressure that may be experienced if there is an explosion in the dust collector system. Furthermore, the dust from the air systems are dropped into a dust receptacle that must be periodically removed and replaced. There is a need to make this removal and replacement as quick, simple, and as safe as possible for the operators.

SUMMARY

What is presented is an interface between a hopper and a dust receptacle of a dust collector system, wherein the hopper has an outlet through which collected dust drops. The interface comprises a slide gate mounted to the outlet of the hopper and a spout mounted to the slide gate. A lid is configured to secure to the top of the dust receptacle. The lid has a coupling configured to secure to the spout. A slot comprising a locking feature is located on either the spout or the coupling. A rod corresponding to the slot is mounted to the other of the spout or the coupling than which the slot is located. The lid may be removed from the dust receptacle by lifting the lid to move the rod through the slot and the lid is secured by twisting the coupling relative to the spout to move the rod into the locking feature. The locking feature may be an opening that is oriented perpendicular to the slot or any other system or device that would hold the slot in place. The rod may be mounted within or outside the coupling or the spout. In some embodiments a compression coupling is configured to secure over the coupling and the spout. A support bracket could be incorporated to bear the weight of the compression coupling.

Those skilled in the art will realize that this invention is capable of embodiments that are different from those shown and that details of the apparatus and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
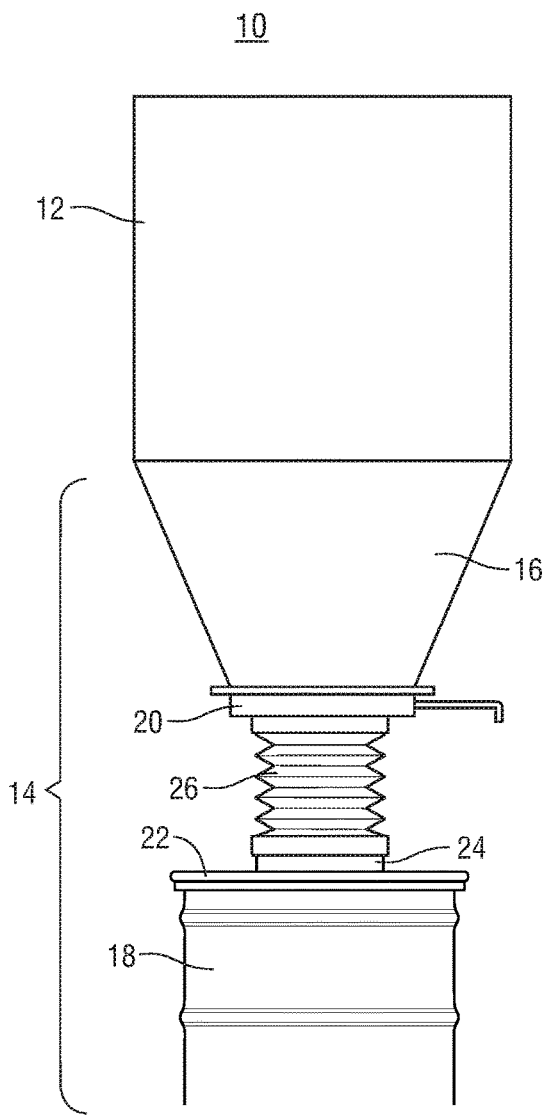
FIG. 1 is a schematic of a prior art dust collector system.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Dust collectors are used to remove dust and other airborne particles from air handling systems typically for industrial applications. There are many different types of dust collector systems in the prior art but in general, as shown in FIG. 1, the prior art dust collector systems 10 comprise a collector system 12 in which dust is removed from the air system to which the dust collector system 10 is connected (not shown) and a discharge system 14 for capturing dust particulate for either waste or reclaim purposes. The collector system 12 may be of any type available in the industry including cartridge dust collectors, cyclone air processors, downdraft benches, mist collectors, etc.

The discharge system 14 comprises a hopper 16 that has an outlet through which collected dust drops out of the collector system 12 and dust receptacle 18 to contain the collected dust. The dust receptacle 18 may be any container that is configured to receive collected dust. The embodiment shown depicts the dust receptacle 18 to be a 55-gallon drum, but it may be a drum of another size or any other type of container. The interface between the hopper 16 and the dust receptacle 18 varies and in the prior art can be of varying types. One common interface comprises a slide gate 20 mounted to the outlet of the hopper 16 with a lid 22 mounted to the dust receptacle 18. The lid 22 comprises a coupling 24 through which collected dust drops into the dust receptacle 18. A flex hose 26 connects the outlet from the slide gate 20 to the coupling 24. The flex hose 26 is a flexible tube that allows some flexibility in the placement of the dust receptacle 18, but it has its limits.

The dust collector system 10 operates as follows: the collector system 12 removes dust and particulate matter from the air system to which it is connected in the manner of the chosen system. The collected dust and particular matter descends into the discharge system 14 through the hopper 16. With the slide gate 20 in the open position, the dust falls through the flex hose 26 and through the coupling 24 and into the dust receptacle 18.

The dust receptacle 18 is periodically removed as it fills with collected dust and debris. This is done by first closing the slide gate 20 so that no further dust drops through the discharge system 14. Closing the slide gate 20 isolates the discharge system 14 from the collector system 12 and allows the dust receptacle 18 to be emptied while the collector system 12 remains in use. The lid 22 is unlatched from the dust receptacle 18 and then either the dust receptacle 18 is replaced with another one or the dust is disposed and the dust receptacle 18 returned to the discharge system 14. This dust removal and disposal step exposes another limitation of the system in that there is generally no convenient place to leave the lid 22 while the dust receptacle 18 is removed from the discharge system 14. This puts stress on the flex hose 26 and makes it prone to damage.

The flex hose 26 has other limitations as well. Many dust collection applications are exposed to some type of combustible dust. This dust must be isolated in the event of an explosion. Explosions have both a pressure wave that can produce pressures up to 7 bar and a flame front that can be as hot as 3,000° F. or more. Both the pressure wave and the flame front must be dealt with as typical flex hoses 26 are unable to withstand such extreme conditions. Prior art systems (not shown) would install a rotary air lock or some other device on the hopper 16 to isolate the pressure wave and flame front from the discharge system 14. These systems can be effective but are often expensive and some systems don't work well at all.

Figure 2:
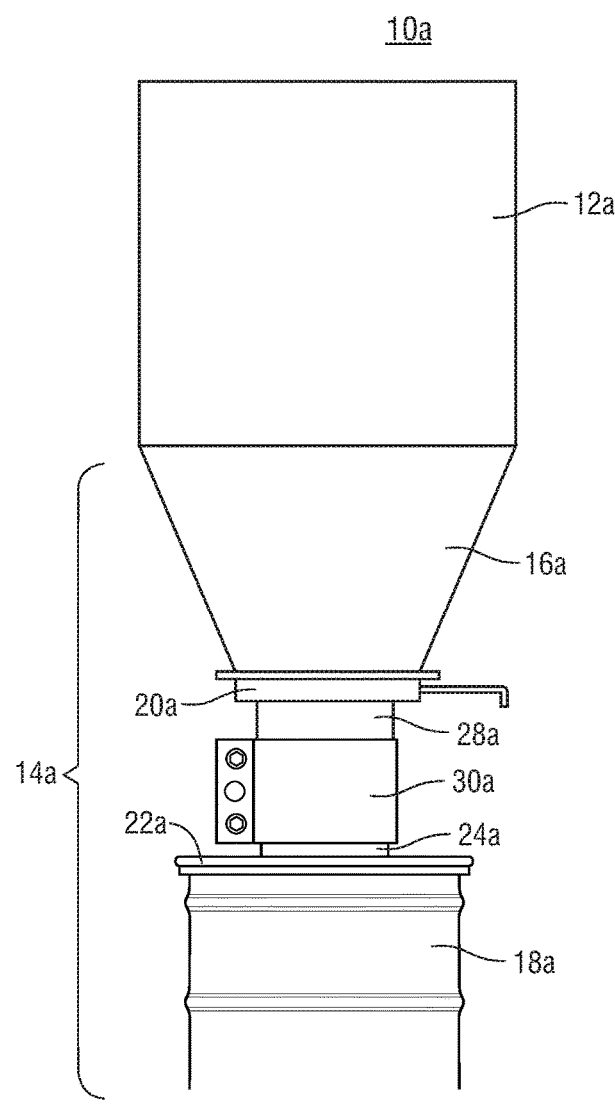
FIG. 2 is a schematic of an embodiment of a dust collector system in which the dust receptacle is receiving dust.
Figure 3:
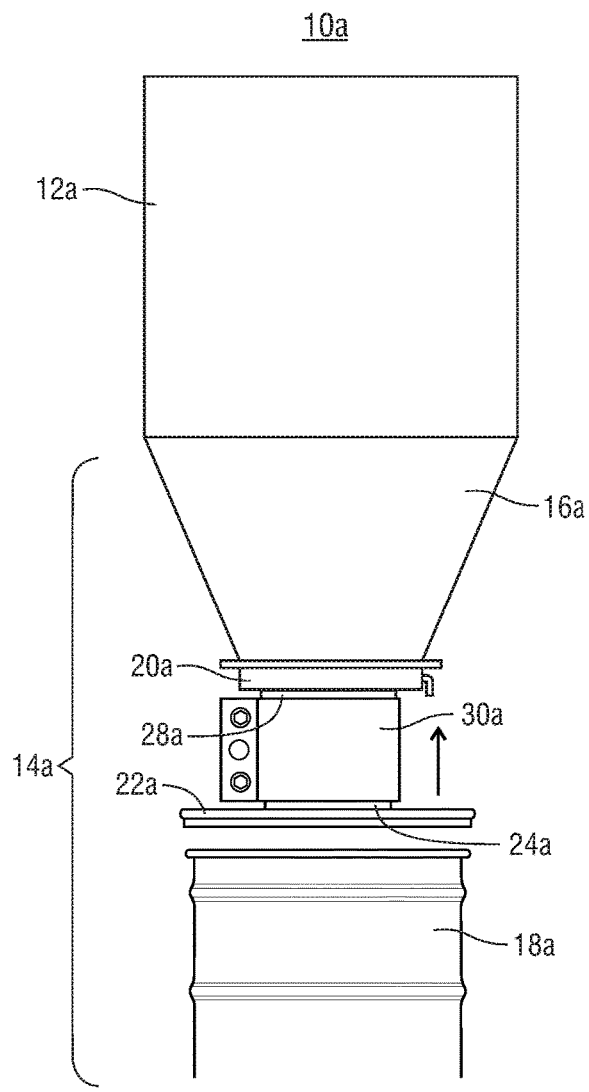
FIG. 3 is a view of the dust collector system of FIG. 2 with the slide gate closed and the dust receptacle ready for removal.
Figure 4:
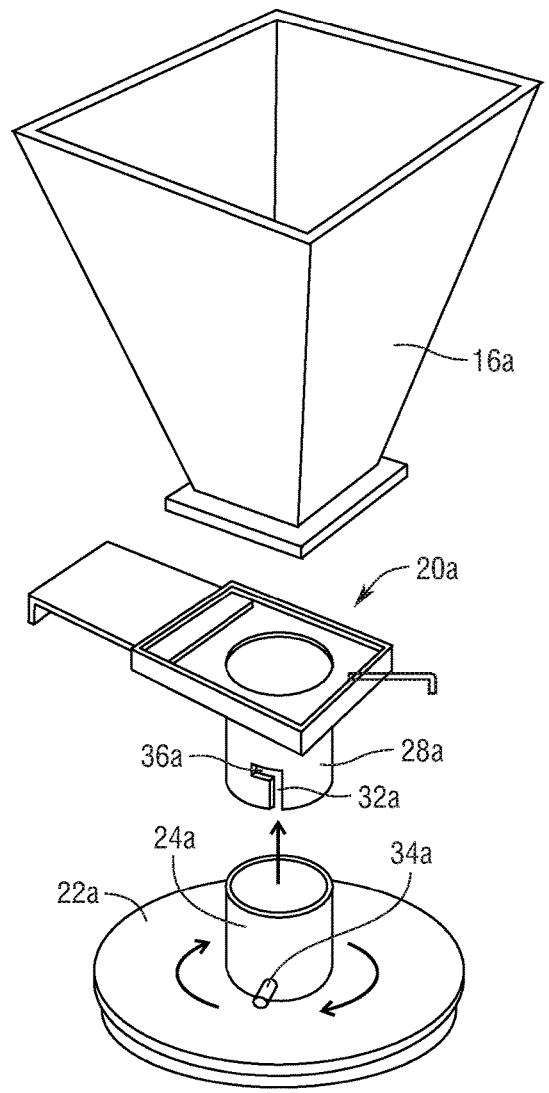
FIG. 4 is an exploded view of the interface between a hopper and a dust receptacle of a dust collector system.

The system presented and shown in FIGS. 2 through 4 addresses some of the limitations of the prior art while retaining some of the flexibility of the prior systems. The dust collector system 10a comprises a collector system 12a in which dust is removed from the air system to which the dust collector system 10a is connected (not shown) and a discharge system 14a for capturing dust particulate for either waste or reclaim purposes. The collector system 12a may be of any type available in the industry including cartridge dust collectors, cyclone air processors, downdraft benches, mist collectors, etc.

The discharge system 14a comprises a hopper 16a that has an outlet through which collected dust drops out of the collector system 12a and a dust receptacle 18a to contain the collected dust. The dust receptacle 18a may be any container that is configured to receive collected dust. The embodiment shown depicts the dust receptacle 18a to be a 55-gallon drum, but it may be a drum of another size or any other type of container. As best understood by comparing FIGS. 2 and 4, the interface between the hopper 16a and the dust receptacle 18a comprises a slide gate 20a mounted to the outlet of the hopper 16a and a lid 22a mounted to the dust receptacle 18a. The lid 22a comprises a coupling 24a through which collected dust drops into the dust receptacle 18a. A spout 28a is mounted to the slide gate 20a. The coupling 24a is configured to secure to the spout 28a. In some embodiments, a compression coupling 30a is configured to secure over the coupling 24a and the spout 28a.

This compression coupling 30a provides support and structure to the discharge system 14a and helps bolster the discharge system 14a against explosions. The compression coupling 30a eliminates the need for rotary air locks or other complicated devices to isolate the discharge system 14a from potential dust related explosions. This makes the dust collector system 10a explosion proof at a significantly lower cost and significantly simpler to operate than prior art systems.

FIG. 4 shows a slot 32a located on the spout 28a, but it is understood the that the slot 32a could be located on either the spout 28a or the coupling 24a. A rod 34a corresponding to the slot 32a is mounted to the other of the spout 28a or the coupling 24a depending on where the slot 32a is located. In FIG. 4, the rod 34a is mounted to the coupling 24a. The slot 32a comprises a locking feature which is used to secure the lid 22a as described below.

The dust collector system 10a operates as follows: the collector system 12a removes dust and particulate matter from the air system to which it is connected in the manner of the chosen system. The collected dust and particulate matter descends into the discharge system 14a through the hopper 16a. With the slide gate 20a in the open position, the dust falls through the spout 28a and through the coupling 24a and into the dust receptacle 18a.

The dust receptacle 18a is periodically removed as it fills with collected dust and debris. As shown in FIG. 3, this is done by first closing the slide gate 20a so that no further dust drops through the discharge system 14a. Closing the slide gate 20a isolates the discharge system 14a from the collector system 12a and allows the dust receptacle 18a to be emptied while the collector system 12a remains in use. The lid 22a is unlatched from the dust receptacle 18a. As best understood by comparing FIGS. 3 and 4, the lid 22a is configured to be removed from the dust receptacle 18a by lifting the lid 22a such that the rod 34a moves through the slot 32a. The lid 22a is secured by twisting the coupling 24a relative to the spout 28a to move the rod 34a into the locking feature 36a. FIG. 4 shows a locking feature 36a that is an opening perpendicular to the slot 32a, but it can be any other system or feature that will hold the rod 34a in place and thereby hold up the lid 22a. The dust receptacle 18a is either replaced with another dust receptacle 18a or the dust is disposed and the dust receptacle 18a returned to the discharge system 14a. The lid 22a is lowered into place by first twisting the coupling 24a relative to the spout 28a to move the rod 34a out of the locking feature 36a. This allows the rod 34a to move through the slot 32a and allows the lid 22a to be lowered onto and latched to the dust receptacle 18a.

This configuration allows the dust receptacle 18a to be set on semi-uneven surfaces and allows some flexibility as to the height of the dust receptacle 18a, so if, for example, the dust receptacle 18a were to be mounted on a dolly or skid, the moveable element of the discharge system 14a would accommodate some differences in heights for various dust receptacle 18a configurations.

Figure 5:
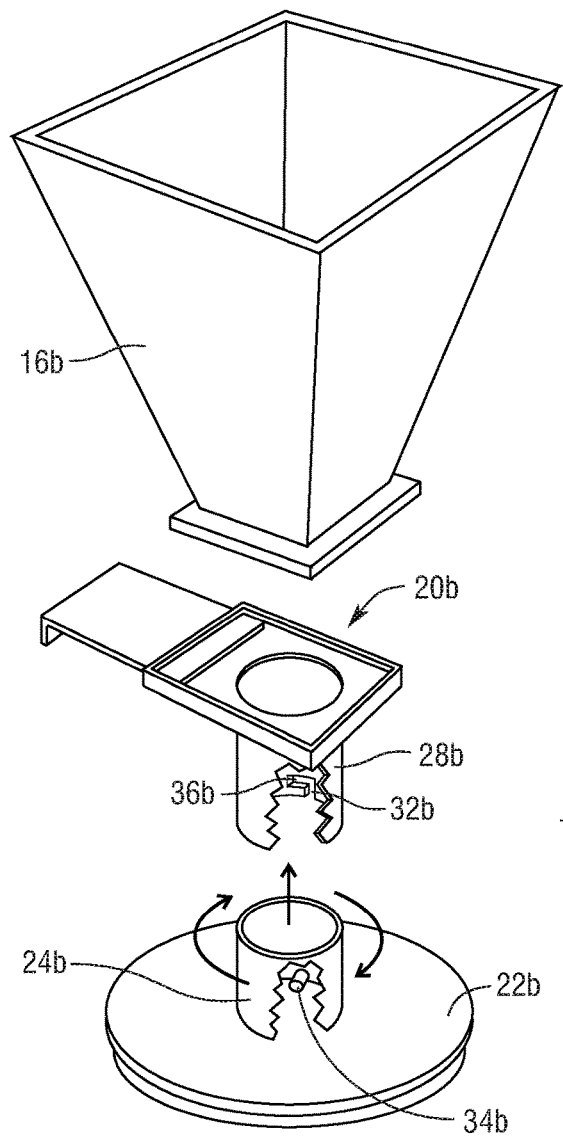
FIG. 5 is an exploded view of another embodiment of the interface between a hopper and a dust receptacle of a dust collector system.

FIG. 4 shows that the rod 34a is mounted outside the coupling 24a. FIG. 5 shows an embodiment in which the rod 34b is mounted within the coupling 24b. Either configuration shown in FIG. 4 or FIG. 5 would achieve the same results of securing the lid out of the way during removal of the dust receptacle. It will be understood that the rod 34b may be located on the spout 28b and the slot located on the coupling 24b.

Figure 6:
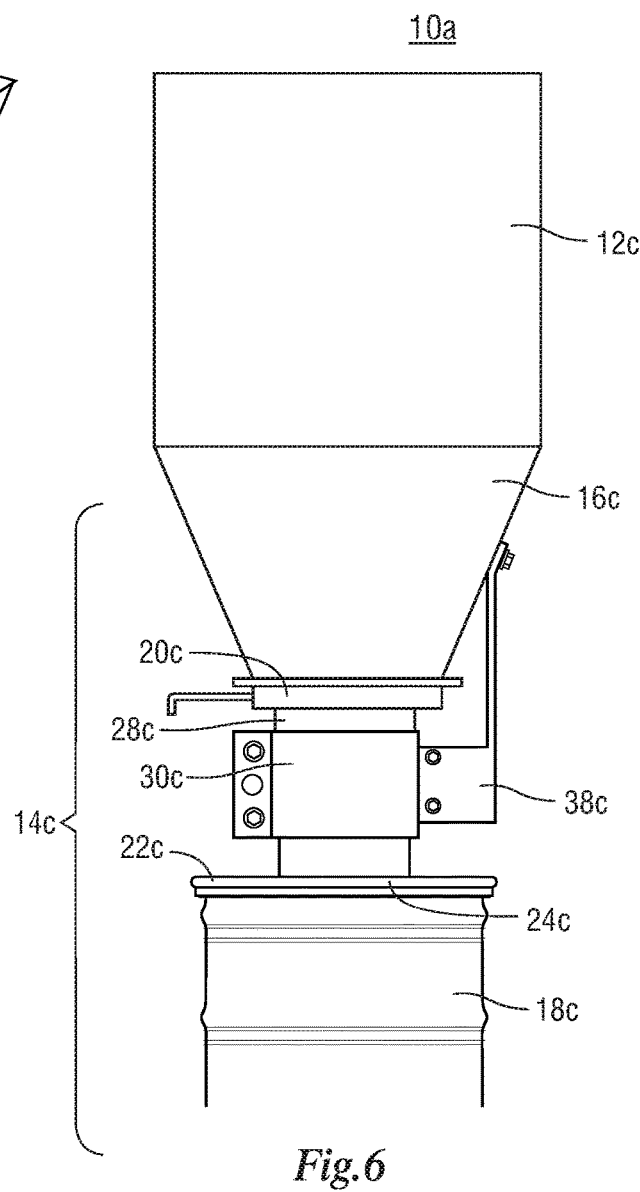
FIG. 6 is a schematic of another embodiment of a dust collector system.

FIG. 6 shows another embodiment of dust collector 10c that is like the earlier described embodiments disclosed herein except that a support bracket 38c is mounted to the hopper 16c to brace and support the compression coupling 30c. The support bracket 38c also provides further strength to the compression coupling 30c to assist in explosion events.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. An interface between a hopper and a dust receptacle of a dust collector system, wherein the hopper has an outlet through which collected dust drops, comprising:
    a slide gate mounted to the outlet of the hopper;
    a spout mounted to said slide gate;
    a lid configured to secure to the top of the dust receptacle, said lid having a coupling configured to secure to said spout;
    a slot located on either said spout or said coupling;
    said slot comprising a locking feature;
    a rod corresponding to said slot wherein said rod is mounted to the other of said spout or said coupling than which said slot is located;

wherein said lid is configured to be removed from the dust receptacle by lifting said lid such that said rod moves through said slot and said lid is secured by twisting said coupling relative to said spout to move said rod into said locking feature.

2. The interface of claim 1 further comprising said locking feature is an opening perpendicular to said slot.

3. The interface of claim 1 further comprising a compression coupling configured to secure over said coupling and said spout.

4. The interface of claim 1 further comprising:
a support bracket; and
a compression coupling configured to secure over said coupling and said spout and to said support bracket, wherein said support bracket bears the weight of said compression coupling.

5. The interface of claim 1 further comprising said rod is mounted within said coupling or said spot.

6. The interface of claim 1 further comprising said rod is mounted outside said coupling or said spout.

\* \* \* \* \*